United States Patent [19]

Walker

[11] 3,998,742

[45] * Dec. 21, 1976

[54] ADDITIVE FOR REDUCING GEL STRENGTH IN AQUEOUS DRILLING FLUIDS

[75] Inventor: Thad O. Walker, Houston, Tex.

[73] Assignee: Texaco Inc., New York, N.Y.

[ * ] Notice: The portion of the term of this patent subsequent to Nov. 19, 1991, has been disclaimed.

[22] Filed: July 22, 1974

[21] Appl. No.: 490,435

Related U.S. Application Data

[63] Continuation-in-part of Ser. No. 315,955, Dec. 18, 1972, Pat. No. 3,849,317.

[52] U.S. Cl. .............................. 252/8.5 A; 175/65; 252/8.5 C

[51] Int. Cl.$^2$ .......................................... C09K 7/02

[58] Field of Search ............... 252/8.5 A, 8.5 C; 175/65

[56] References Cited

UNITED STATES PATENTS

| | | | |
|---|---|---|---|
| 2,452,021 | 10/1948 | Wayne | 252/8.5 |
| 2,713,029 | 7/1955 | Fuller | 252/8.5 |
| 2,868,726 | 1/1959 | Brukner et al. | 252/8.5 |
| 3,232,871 | 2/1966 | Walker et al. | 252/8.5 |
| 3,849,317 | 11/1974 | Walker | 252/8.5 |

FOREIGN PATENTS OR APPLICATIONS

| | | | |
|---|---|---|---|
| 1,105,328 | 6/1955 | France | 252/8.5 |

*Primary Examiner*—Herbert B. Guynn
*Attorney, Agent, or Firm*—T. H. Whaley; C. G. Ries; Jack H. Park

[57] ABSTRACT

The gel strengths and yield points of aqueous fresh water drilling fluids having from 0 to 200 parts per million calcium dissolved therein may be reduced by adding to the drilling fluids an effective amount of a hydrolyzed cereal solid, which is predominantly a hexasaccharide and higher poly-saccharides. The additive is effective only if the drilling fluid pH is above about 10.0 and preferably about 11.0 or above. The effectiveness is improved by adding from about 1/8 to about 1 pound of a water soluble chromate or dichromate salt per barrel of drilling fluid.

10 Claims, No Drawings

ADDITIVE FOR REDUCING GEL STRENGTH IN AQUEOUS DRILLING FLUIDS

CROSS REFERENCE TO RELATED APPLICATIONS

This application is a continuation-in-part of my co-pending application Ser. No. 315,955 filed Dec. 18, 1972, now U.S. Pat. No. 3,849,317.

BACKGROUND OF THE INVENTION

1. Field of the Invention

This invention relates to a novel additive for aqueous drilling fluids and a method for drilling wells in subsurface formations utilizing drilling fluids containing said additive, and particularly to an additive for reducing the gel strengths and yield points of high pH, fresh water drilling fluids.

2. Prior Art

Drilling fluids, or drilling muds as they are sometimes called, are slurries of clayey solids used in the drilling of wells in the earth, such as are drilled for the purpose of tapping subterranean deposits of petroleum, gas, and other fluid materials. Drilling fluids have a number of functions, the most important of which are removing formation cuttings from the well, sealing off permeable formations of gas, oil or water which may be encountered at various levels as the well is drilled into the subterranean formation, cooling and lubricating the drilling tool and drill pipe which carries the tool, and holding the cuttings in suspension in the event of shut down in the drilling and pumping of the drilling fluid.

An ideal drilling fluid is a thixotropic fluid, i.e., a fluid whose viscosity decreases as the degree of agitation or shear rate increases. In the drilling of wells utilizing drilling fluids, agitation or shearing caused by circulation is halted, however, the fluid gels or forms a gel structure which will support the drilled cuttings to prevent them from falling down into the bottom of the hole. The rate of gel formation must be such as to permit the cuttings to fall only a short distance before the gel structure is sufficiently strong to support them. It is important to maintain the degree of gelation and the rate of gelation within narrow limits, since excessive gel formation would be detrimental to the resumption of drilling operations, and will also tend to entrain gas in the drilling fluid. Entrainment of gas in the drilling fluid leads to a substantial reduction in the density of the drilling fluid, which can be detrimental to continued safe drilling of the well, especially if high pressure formations are to be encountered. If the gelation rate and/or gel strength are below the desired range, formation cutting and other solid materials such as weighting material will fall to the bottom of the hole which results in sticking of the drill pipe.

Fresh water drilling fluids, e.g. aqueous drilling fluids containing little or no lime or other water soluble calcium salts, are widely employed in drilling operations. Usually some substance must be similarly employed in fresh water drilling fluids to control gelation rate and degree of gelation or gel strength within acceptable operating limits. Agents commonly employed for this purpose include lignosulfonates, and dextrin. Most commercial thinners are not always entirely satisfactory for a variety of reasons, including sensitivity thereof to high temperatures, contamination with extraneous substances sometimes encountered in drilling and high material costs. Also, many commercially available dispersants are ineffective in the presence of calcium and/or sodium chloride. If the fluid is converted to some specialized fluid at a later time, which involves adding calcium salts or sodium chloride the effectiveness of the fresh water fluid will be lost and so more dispersant will be required than would be the case if the fresh water fluid had not lost its effectiveness.

Thus it can be appreciated that there is a substantial need for having additional dispersants for fresh water drilling fluids to meet varying conditions encountered in the field and especially which will be effective when the drilling fluid is converted to a chemicalized system.

SUMMARY OF THE INVENTION

The gel strengths and yield point of an aqueous drilling fluid having from 0 to about 200 parts per million calcium dissolved in the aqueous phase, and which have a pH above 10 and preferably above 11.0, are effectively reduced by treating the drilling fluid with a hydrolyzed cereal solids composition which consists essentially of polysaccharide, principally hexa-saccharide and above. From about 1/8 to about 10 pounds of the material per barrel of drilling fluid may be used, and preferably from 1/2 to 6 pounds of the material per barrel of drilling fluid will achieve a desirable reduction in gel strength and yield point. From about 1/8 to about 2 pounds of a water soluble chromate or dichromate salt may be included per barrel of drilling fluid.

DESCRIPTION OF THE PREFERRED EMBODIMENTS

This invention pertains to a novel additive for an aqueous fresh water or low calcium drilling fluid for reducing the gel strength and yield point of the drilling fluid. Such additives are commonly also referred to as dispersants or thinners for drilling fluids. The material is a hydrolyzed ceral solids, a food additive whose carbohydrate composition is given in Table I below.

TABLE I

| Composition of Hydrolyzed Cereal Solids | |
|---|---|
| Dextrose | 1% |
| Di-saccharide | 4% |
| Tri-saccharide | 5% |
| Tetra-saccharide | 4% |
| Penta-saccharide | 4% |
| Hexa-saccharide and above | 82% |

The material is available commercially under the tradename MOR-REX from CPC International Inc. The material is available in a granular form for use in food products as a nutritive bulk agent. It is typically available with approximately 5% moisture and has a pH of from 4.5 to 5.5.

The class of aqueous drilling fluids for which this additive is especially desirable for the purpose of reducing gel strengths and yield points, are aqueous drilling fluids having from 0 to about 200 parts per million of calcium dissolved in the aqueous phase, and having a pH of at least 10 and preferably above 11.0. These are commonly referred to as "fresh water" drilling fluids or drilling muds. They are widely used in the drilling of wells including oil and gas wells because they are relatively inexpensive, easy to control and quite effective. Even if a specialized drilling fluid is to be used to control special problems expected in deeper formation, fresh water drilling fluids are often used in the initial drilling phase, and the drilling fluid is then converted to the specialized fluid.

If the dispersant used in the fresh water drilling fluid being used to drill the "top hole" is not effective in the specialized drilling fluid to be used for drilling the deeper formation, the material will be essentially lost and greater quantities of another dispersant will be required in the specialized fluid than would be the case if a dispersant were used in the fresh water drilling fluid which is effective in the specialized fluid. For example, in commonly owned, copending application Ser. No. 309,327 filed Nov. 24, 1972, now abandoned, there is described a novel low solids shale control drilling fluid which is unusually effective for drilling certain troublesome shale intervals frequently encountered in drilling in the Southwestern United States. In my copending application Ser. No. 315,955 filed Dec. 18, 1972, now U.S. Pat. No. 3,849,317 there is described a novel additive for the above described Low Solids Shale Control Drilling Fluid, in which most known drilling fluid dispersants are ineffective. The material, which is a hydrolized cereal solid being comprised of hexa-saccharides and higher polysaccharides.

Initially it appeared that the material was ineffective in drilling fluids which contained no calcium. I have found, however, that this material is effective in drilling fluids having from 0 to 200 parts per million soluble calcium dissolved in the aqueous phase, if the pH of the drilling fluid is increased to at least 10, and preferably to 11.0 or more. Additionally, I have found that the addition of a small amount of a water soluble chromate or dichromate salt, e.g. sodium or potassium chromate or dichromate, will increase the effectiveness of the hydrolyzed cereal solid product to a surprisingly great degree. This makes it possible, then, to use the same material, the hydrolyzed cereal solids, as the dispersant in the fresh water drilling fluid used to drill the top hole portion of the well as is used in the high calcium drilling fluid used later in the drilling program. As a result, the amount of dispersant required on converting the top hole fluid to, for example, a shale control drilling fluid, is greatly reduced.

The concentration of hydrolyzed cereal solids necessary to reduce the gel strength of a drilling fluid to the desired range will depend on the original gel strength of the fluid as well as on other factors. Generally, it is preferable to pilot test the response to determine the optimum concentration. Very slight adjustments may require as little as ⅛ pound of hydrolyzed cereal solids per barrel of drilling fluid, and in extreme cases as much as 8 to 10 pounds per barrel may be required. Generally, the desired reduction in gel strength will be achieved by using from about 1 to about 6 pounds of hydrolyzed cereal solids per barrel of drilling fluid.

EXPERIMENTAL

Two types of measurements were used to develop the experimental data reported herein. Gel Strengths are measured using a Shearometer tube, and a Fann VG meter is used to determine other rheological properties.

It has become practice to those skilled in the art of drilling fluid technology to measure gel strengths by the use of a shearometer tube. A measured quantity of drilling fluid is placed in a container and shaken, and the shearometer tube is dropped into the drilling fluid immediately after the shaking or other agitation is terminated. If the shearometer tube sinks only part way into the drilling fluid contained in the container during a 60 second time interval, the tube is removed and the depth that it penetrated the fluid is measured. The drilling fluid is allowed to stand without further agitation for 10 minutes, and the test is repeated. Again, if the shearometer tube sinks only part way to the bottom of the container, the depth of penetration is measured. If the shearometer sinks 3 centimeters in the test conducted immediately after agitation, and sinks 5 centimeters after the drilling fluid has stood without further agitation for 10 minutes, the gel strength is indicated as 3–5. If on the other hand, the shearometer tube drops to the bottom of the container in less than 60 seconds, the time required for the shearometer tube to drop all the way to the bottom of the container is noted. If the tube drops to the bottom of the container in 15 seconds, for example, the gel strength is indicated as $0^{15}$. Thus, in the course of measuring a gel strength of a drilling fluid, the shearometer tube dropped to the bottom of the container in 10 seconds in the test conducted immediately after agitation, and drops to the bottom in 30 seconds after the drilling fluid has stood without further agitation for 10 minutes, the drill strength is indicated as $0^{10} - 0^{30}$.

The Fann VG Meter is a type of Stormer Viscometer, using an outer cylinder which can be rotated at 300 revolutions per minute (r.p.m.) and at 600 r.p.m. An inner, concentric cylinder is connected to a scale to permit the operator to read same. The reading at 600 rpm and 300 rpm are recorded. From these readings, one can calculate plastic viscosity, yield point and apparent viscosity from the following equations:

1. plastic viscosity = 600 r.p.m. reading - 300 r.p.m. reading
2. yield point = plastic viscosity - 300 r.p.m. reading
3. apparent viscosity = ½ × 600 r.p.m. reading The yield point is the parameter of particular interest to this invention. Generally, a lower yield point value indicated that the dispersant is effective in the particular drilling fluid being tested.

The hydrolyzed cereal solids additive was tested in a low calcium, native, aqueous drilling fluid and the data are contained in Table II below.

TABLE II

HYDROLYZED CEREAL SOLIDS IN FRESH WATER DRILLING FLUID

| Run | Additive | Pounds Per Barrel | Fann VG Meter Readings | | | | | | Gel Strength[4] | |
|-----|----------|-------------------|------------|------------|-----|-----|-----|-----|---------|--------|
| | | | 300 RPM | 600 RPM | PV[1] | YP[2] | AV[3] | pH | Initial | 10 min. |
| A | None | — | 78 | 70 | 8 | 62 | 39 | 8.4 | 40 | 50 |
| B | Hydrolyzed Cereal Solid | 1 | 53 | 42 | 11 | 31 | 27.5 | 7.9 | 14 | 17 |
| C | Hydrolyzed Cereal Solid | 1 | 79 | 58 | 21 | 37 | 39.5 | 9.5 | 20 | 30 |
| D | Hydrolyzed Cereal Solid | 1 | 57 | 37 | 20 | 17 | 28.5 | 11.5 | $0^7$ | 6 |
| E | Hydrolyzed Cereal Solid | 2 | 52 | 39 | 13 | 26 | 26 | 8.3 | 10 | 14 |
| F | Hydrolyzed Cereal Solid | 2 | 53 | 41 | 12 | 29 | 27.5 | 9.5 | 14 | 18 |
| G | Hydrolyzed Cereal Solid | 2 | 48 | 30 | 18 | 12 | 24 | 11.5 | $0^0$ | 4 |

TABLE II-continued

HYDROLYZED CEREAL SOLIDS IN FRESH WATER DRILLING FLUID

| Run | Additive | Pounds Per Barrel | Fann VG Meter Readings 300 RPM | 600 RPM | PV[1] | YP[2] | AV[3] | pH | Gel Strength[4] Initial | 10 min. |
|---|---|---|---|---|---|---|---|---|---|---|
| H | Hydrolyzed Cereal Solid | 4 | 44 | 33 | 11 | 22 | 22 | 8.3 | 9 | 13 |
| I | Hydrolyzed Cereal Solid | 4 | 60 | 42 | 18 | 24 | 30 | 9.5 | 8.5 | 13 |
| J | Hydrolyzed Cereal Solid | 4 | 40 | 27 | 13 | 14 | 20 | 11.4 | 0[2] | 5.25 |

[1]PV = plastic viscosity, calculated by subtracting the 300 r.p.m. reading on the Fann VG Meter from the 600 r.p.m. reading
[2]YP = yield point, calculated by subtracting the 300 r.p.m. reading on the Fann VG Meter from the plastic viscosity.
[3]AV = apparent viscosity, calculated by dividing the 600 r.p.m. reading on the Fann VG Meter by 2.
[4]Gel strengths measured using shearometer tube.

Run A gives the rheological properties of the untreated base drilling fluid. As can be seen in run B, the yield in a fresh water drilling fluid. The data are contained in Table III below.

TABLE III

HYDROLYZED CEREAL AND CHROMATE OR DICHROMATE SALTS

| Run | Lbs. Per BBL Hydrolyzed Cereal Solid | Additive | Lbs. Per BBL Additive | Fann VG Meter 600 RPM | 300 RPM | PV[1] | YP[2] | AV[3] | pH | Gel Strength[4] Initial | 10 min. |
|---|---|---|---|---|---|---|---|---|---|---|---|
| K | 0 | None | 0 | 94 | 85 | 9 | 76 | 47 | 8.1 | 35 | 60 |
| L | 4 | None | 0 | 75 | 51 | 24 | 27 | 37.5 | 9.8 | 13 | 18 |
| M | 4 | None | 0 | 57 | 35 | 22 | 13 | 28.5 | 11.5 | 0[1] | 0[8] |
| N | 0 | Sodium Chromate | ½ | 100 | 98 | 2 | 96 | 50 | 9.5 | 50 | 60 |
| O | 0 | Sodium Chromate | ½ | 67 | 51 | 16 | 35 | 33.5 | 11.5 | 30 | 60 |
| P | 4 | Sodium Chromate | ½ | 76 | 50 | 26 | 24 | 38 | 9.7 | 9 | 13 |
| Q | 4 | Sodium Chromate | ½ | 58 | 32 | 26 | 6 | 29 | 11.4 | 0⁰ | 0⁰ |
| R | 0 | Sodium Dichromate | ½ | 108 | 103 | 5 | 98 | 54 | 9.6 | 40 | 60 |
| S | 0 | Sodium Dichromate | ½ | 61 | 56 | 5 | 51 | 30.5 | 11.4 | 30 | 50 |
| T | 4 | Sodium Dichromate | ½ | 61 | 40 | 21 | 19 | 30.5 | 9.9 | 5 | 6.5 |
| U | 4 | Sodium Dichromate | ½ | 35 | 18 | 17 | 1 | 17.5 | 11.4 | 0⁰ | 0⁰ |

[1]PV = plastic viscosity, calculated by subtracting the 300 r.p.m. reading on the Fann VG Meter from the 600 r.p.m. reading.
[2]YP = yield point, calculated by subtracting the 300 r.p.m. reading on the Fann VG Meter from the plastic viscosity.
[3]AV = apparent viscosity, calculated by dividing the 600 r.p.m. reading on the Fann VG Meter by 2.
[4]Gel strengths measured using shearometer tube.

point is reduced only from 62 to 31 using one pound of the hydrolized cereal solid per barrel of drilling fluid, at a pH of 7.9; thus the material is not especially effective at this pH. Run C, the same as run B except the pH has been raised to 9.5 by the addition of sodium hydroxide, shows even less reduction in yield point or gel strength. At a pH of 11.5, however, as shown in run D, the yield point is reduced from 62 to 17, and the gel strength is reduced from the 40 – 50 values of the untreated drilling fluid to 0[7] – 6. This is a very satisfactory repsonse for the low, 1 pound per barrel treatment.

In run E, 2 pounds per barrel of the hydrolyzed cereal solid material is added to the base drilling fluid (Run A), and at a pH of 8.3, the yield point is 39 and the gel strengths are 10 – 14. All of these values are only slightly better than run B, using 1 pound per barrel of hydrolyzed cereal solid at a similar low pH value. In run F, using the same 2 pounds per barrel hydrolyzed cereal solid but at a pH of 9.5, essentially the same values are obtained for gel strengths and yield point. In run G, however, wherein the pH is raised to a value of 11.5, the yield point was reduced to 12 and the gel strengths to 0⁰ – 4, a satisfactory response.

Runs H, I, and J follow the same procedure as above, all using 4 pounds per barrel of hydrolyzed cereal solid and the pH values of 8.3, 9.5 and 11.4. It can be seen that good response is obtained at a pH around 11 but only fair results therebelow.

Thus the data contained in Table II clearly show that hydrolyzed cereal solids effectively reduce the yield point and gel strengths of a fresh water drilling fluid at a pH of at least 10 and preferably at a pH above 11.0.

Additional laboratory experiments were performed to determine whether the addition of a small amount of a water soluble chromate or dichromate salt would increase the effectiveness of the hydrolyzed cereal solid Run K of Table III is a base drilling fluid with no treatment. Runs L and M demonstrate the effectiveness of four pounds per barrel of hydrolyzed cereal solid at low and high pH values. Runs N and O demonstrate that sodium chromate is ineffective for reducing the yield point and gel strengths of a fresh water drilling fluid at either low or high pH values, when no hydrolyzed cereal solids are used with the sodium chromate. Runs P and Q show that the use of only ½ pound of sodium chromate in combination with 4 pounds of hydrolyzed cereal solid per barrel of drilling fluid, results in very effective reduction of yield point and gel strengths. Comparison of runs L and M with runs P and Q show that the use of sodium chromate and hydrolyzed cereal solids interact synergistically at a pH either of 9.8 or 11.4, since the magnitude of reduction in yield point and gel strength is greater at each pH range when sodium chromate is used than when it is not used, with hydrolyzed cereal solids.

Runs R, S, T and U show that sodium dichromate performs in essentially the same manner as sodium chromate. Other water soluble chromate or dichromate salts may similarly be used. For example, the potassium, lithium or ammonia salt of chromate or dichromate may be used.

Thus, the above data has established that the hydrolyzed cereal solid of the subject invention was quite effective for reducing the yield point and gel strength of an aqueous drilling fluid which containing little or no soluble calcium so long as the pH is above 10 and preferably above 11.0. Moreover, the use of from about ⅛ to about 2 and preferably about ½ to about 1 pound per barrel of a water soluble chromate or dichromate salt will materially improve the effectiveness of the hydrolyzed cereal solid as a reducer of gel strength and yield point.

While my invention has been described in terms of a number of illustrative embodiments, it is not so limited since many variations thereof will be apparent to those skilled in the art of drilling fluid technology without departing from the true spririt and scope of my invention, and it is my intention that my invention be defined and limited only by the limitations and restrictions appearing in the claims appended herein below.

I claim:

1. An aqueous drilling fluid having an aqueous phase containing less than 200 parts per million calcium dissolved therein and having a pH above 10, containing as the additive for reducing gel strength and yield point, hydrolyzed cereal solids which is comprised of from about 15% to about 25% by weight di-saccharides, tri-saccharides, tetra-saccharides, and penta-saccharides, and from about 75 to about 85% by weight hexa-saccharides and above.

2. The drilling fluid as recited in claim 1 wherein from about ⅛ to about 10 pounds of the hydrolyzed cereal solid is added per barrel of drilling fluid.

3. The drilling fluid as recited in claim 1 wherein from about 1 to about 5 pounds of the hydrolyzed cereal solid is added per barrel of drilling fluid.

4. The drilling fluid as recited in claim 1 wherein the pH is above about 11.0.

5. The drilling fluid as recited in claim 1 wherein from about ⅛ to about 2 pounds of a water soluble chromate or dichromate salt is present in the drilling fluid.

6. The drilling fluid as recited in claim 5 wherein the water soluble dichromate salt is sodium chromate.

7. The drilling fluid as recited in claim 5 wherein the water soluble chromate salt is sodium chromate.

8. The drilling fluid as recited in claim 5 wherein from about ½ to about 1 pound of the water soluble chromate or dichromate salt is present per barrel of drilling fluid.

9. In a method of drilling wells in the earth wherein a drilling fluid is passed through the well in contact with earth formations during the drilling operations, the improvement which comprises contacting said earth formations with an aqueous drilling fluid whose filtrate phase contains less than about 200 parts per million soluble calcium and which drilling fluid has a pH of at least 10.0, and which fluid further contains at least ½ pound of a hydrolyzed cereal solid per barrel of drilling fluid, said hydrolyzed cereal solid being comprised of at least 75% hexa-saccharide and above.

10. A method as recited in claim 9 wherein the drilling fluid also contains from about ⅛ to about 1 pound of a water soluble chromate or dichromate salt per barrel of drilling fluid.

* * * * *